US010487970B2

(12) United States Patent
Randrianarivony (10) Patent No.: US 10,487,970 B2
(45) Date of Patent: Nov. 26, 2019

(54) SWIVEL STACK (71) Applicant: SINGLE BUOY MOORINGS INC., Marly (CH)

(72) Inventor: Liva Christian Randrianarivony, Monaco (FR)

(73) Assignee: SINGLE BUOY MOORINGS INC., Marly (CH)

( * ) Notice: Subject to any disclaimer, the term of this patent is extended or adjusted under 35 U.S.C. 154(b) by 0 days.

(21) Appl. No.: 15/769,848

(22) PCT Filed: Oct. 21, 2016

(86) PCT No.: PCT/EP2016/075395
§ 371 (c)(1),
(2) Date: Apr. 20, 2018

(87) PCT Pub. No.: WO2017/068132
PCT Pub. Date: Apr. 27, 2017

(65) Prior Publication Data
US 2018/0313486 A1 Nov. 1, 2018

(30) Foreign Application Priority Data
Oct. 23, 2015 (EP) ..................................... 15191243

(51) Int. Cl.
*F16L 39/06* (2006.01)
*B63B 21/50* (2006.01)
*B63B 35/44* (2006.01)

(52) U.S. Cl.
CPC ............ *F16L 39/06* (2013.01); *B63B 21/507* (2013.01); *B63B 35/44* (2013.01); *B63B 2035/448* (2013.01)

(58) Field of Classification Search
CPC . F16L 17/00; F16L 17/02; F16L 39/00; F16L 39/06; F16L 27/00; F16L 27/08;
(Continued)

(56) References Cited

U.S. PATENT DOCUMENTS 4,647,076 A   3/1987 Pollack et al.
4,925,219 A * 5/1990 Pollack ................. F16L 27/087
                                                     285/95
(Continued)

FOREIGN PATENT DOCUMENTS

KR   101454375 B1   10/2014
WO     86/00972 A1    2/1986
WO     99/65762 A1   12/1999

OTHER PUBLICATIONS

International Search Report, dated Jan. 13, 2017, from corresponding PCT application No. PCT/EP2016/075395.

*Primary Examiner* — Lars A Olson
(74) *Attorney, Agent, or Firm* — Young & Thompson (57) ABSTRACT

A swivel stack for transfer of fluid across a rotary interface around a main rotation axis between an incoming flow-line and an outgoing flow-line, includes an inner cylindrical body and a first cylindrical annular element. The cylindrical annular element is mounted on the inner cylindrical body so the rotational axes of the annular element and cylindrical body coincide. The inner cylindrical body has an internal conduit running from a cylindrical base parallel to the rotation axis. The conduit has an outlet port communicating with a circumferential cavity on the cylindrical surface of the inner cylindrical body. The first cylindrical annular element includes a toroidal cavity on its internal cylindrical surface. The first cylindrical annular element is mounted on the inner cylindrical body at the level of the outlet port so the toroidal cavity and the circumferential cavity form an annular chamber communicating with the outlet port of the internal conduit.

17 Claims, 6 Drawing Sheets (58) Field of Classification Search
CPC ......... B63B 35/00; B63B 35/44; B63B 21/00;
B63B 21/50; B63B 21/507; B63B 21/508;
B63B 22/00; B63B 22/02; E21B 17/05
USPC .......................... 114/230.12; 285/95, 121.3
See application file for complete search history.

(56) References Cited

U.S. PATENT DOCUMENTS

| | | | |
|---|---|---|---|
| 6,093,068 A | 7/2000 | Turner et al. | |
| 2002/0043800 A1* | 4/2002 | Montgomery | F16L 39/04 285/95 |
| 2015/0226358 A1* | 8/2015 | Boatman | F16L 39/06 285/272 |
| 2016/0377211 A1* | 12/2016 | Menardo | E21B 17/05 285/121.3 |

* cited by examiner

SWIVEL STACK

FIELD OF THE INVENTION

The present invention relates to a swivel stack comprising one or more swivels for transfer of fluid across a rotary interface.

BACKGROUND

Fluid swivel stacks are known in the art for transfer of high-pressure fluids across multiple rotary interfaces between an incoming fluid line and an outgoing product piping, i.e., one rotary interface per swivel in the swivel stack. Applications for such a swivel stack include for example offshore oil and gas explorations where high-pressure flows of oil and/or gas are transferred from a (deep-sea) offshore well to a floating vessel such as a Floating Production Storage and Offloading (FPSO) vessel. Typically, such a floating vessel is equipped with a turret mooring system that can couple a mooring buoy or a "mooring structure" holding one or more riser lines from the well, to product piping ducts on the vessel. Since the vessel can weathervane in its moored position, the turret mooring system should allow some rotation between the vessel and the buoy. The swivel stack is likewise adapted to provide rotation between the incoming fluid line and the product piping in each swivel of the stack.

It has been observed that the number of incoming flow lines from a production to the FPSO vessel tends to increase to allow an increase of the throughput from the well to the FPSO. This causes the swivel stack to become more complex as more incoming flow lines need to be accommodated in the turret, mainly by increasing the number of swivels in the swivel stack. As a result, the height of the swivel stack increases. Also the diameter of the swivel stack needs to be enlarged as more incoming flow lines are assembled in the swivel stack. It will be understood that the weight of the stack also increases which requires the use of reinforcements in the construction of the turret and the swivel stack.

Moreover, the increased complexity poses some demands with respect to access, maintenance, repair, and operation that should remain feasible and straightforward. This contributes also to a design of a swivel stack that is large, tall and heavy. For instance, sufficient spacing shall be ensured between consecutive units to allow access in view of local dismantling of the unit being repaired for seal replacement.

It is an object of the present invention to overcome or mitigate one or more of these disadvantages from the prior art.

SUMMARY OF THE INVENTION

The object is achieved by a swivel stack for transfer of fluid across a rotary interface around a main rotation axis between an incoming flow-line and an outgoing flow-line, the swivel stack comprising an inner cylindrical body and at least a first cylindrical annular element, the at least first cylindrical annular element mounted on the inner cylindrical body such that the rotation axis of the annular element and the rotation axis of the cylindrical body coincide; the inner cylindrical body having at least one internal conduit running from a cylindrical base of the inner cylindrical body parallel to the rotation axis of the inner cylindrical body; the at least one conduit having an outlet port in communication with a circumferential cavity on the cylindrical surface of the inner cylindrical body; the at least first cylindrical annular element comprising a toroidal cavity on its internal cylindrical surface; the at least first cylindrical annular element being mounted on the inner cylindrical body at the level of the outlet port of the conduit to provide that the toroidal cavity and the circumferential cavity form an annular chamber in fluid communication with the outlet port of the at least one internal conduit, and the cylindrical surface of the inner cylindrical body comprising a first circumferential groove below the level of the outlet port, in which a lower bushing is received, and a second circumferential groove above the level of the outlet port in which an upper bushing is received; the cylindrical annular element being rotatable around the inner cylindrical body while axially in locked position at the level of the outlet port of the conduit between the lower bushing and the upper bushing.

Basically, by use of a massive inner cylindrical body core in which incoming flow lines are created, a swivel stack design based on a piston seal concept is created, i.e., the cylindrical annular elements are stacked around the central inner cylindrical body.

The upper and lower bushings are extending radially from the cylindrical surface of the cylindrical body which facilitates the axial locking of the cylindrical annular element on the cylindrical body.

In this manner, a swivel stack is obtained that is comparatively compact with respect to prior art swivel stacks. As a result, the complexity, height and weight of the swivel stack is reduced with respect of prior art swivel stacks comprising the same number of swivels.

According to an aspect, the invention provides a swivel stack as described above, wherein a sand barrier seal ring is mounted on a bottom edge of the circumferential cavity configured for overlap with a bottom portion of the toroidal cavity of the cylindrical annular element.

The sand barrier seal ring prevents the ingress of any particles into the seal groove cavity between the inner cylindrical body and the cylindrical annular element.

According to an aspect, the invention provides a swivel stack as described above, wherein each of the upper and lower bushings comprises an inner mounting ring and a bushing ring; the inner mounting ring comprising a radial protruding edge and being positioned in the respective circumferential groove; the bushing ring being mounted on the radial protruding edge of the inner mounting ring.

According to an aspect, the invention provides a swivel stack as described above, wherein the inner mounting ring comprises a top split ring, and a bottom split ring; the top split ring and bottom split ring having a width corresponding with a width of the circumferential groove; the top split ring having a thickness corresponding with a depth of the circumferential groove; the bottom split ring having a thickness larger than the depth of the circumferential groove, such that the protruding portion of the bottom split ring forms the radial protruding edge.

According to an aspect, the invention provides a swivel stack as described above, wherein the bushing ring of the upper bushing comprises a supporting surface for an upper radial surface (i.e., extending in radial direction) of the cylindrical annular element.

According to an aspect, the invention provides a swivel stack as described above, wherein the bushing ring of the lower bushing comprises a supporting surface for a lower radial surface of the cylindrical annular element.

According to an aspect, the invention provides a swivel stack as described above, wherein the supporting surface of the bushing ring comprises a low friction surface material.

According to an aspect, the invention provides a swivel stack as described above, wherein the bushing ring comprises a top bushing ring mounted on an upper surface of the protruding edge and a bottom bushing ring mounted on an a lower surface of the protruding edge.

According to an aspect, the invention provides a swivel stack as described above, wherein the swivel stack comprises at least a second cylindrical annular element; the second cylindrical annular element mounted on the inner cylindrical body below or above the first cylindrical annular element, wherein the at least one conduit has a second outlet port in communication with a circumferential cavity on the cylindrical surface of the inner cylindrical body; the second cylindrical annular element comprises a toroidal cavity on its internal cylindrical surface and is mounted on the inner cylindrical body at the level of the second outlet port of the conduit to provide that the toroidal cavity of the second cylindrical annular element and the circumferential cavity associated with the second outlet port form an annular chamber in fluid communication with the second outlet port of the at least one internal conduit.

According to an aspect, the invention provides a swivel stack as described above, wherein the diameter of the inner cylindrical body at the level of the second outlet port is identical to the diameter of the inner cylindrical body at the level of the first outlet port.

According to an aspect, the invention provides a swivel stack as described above, wherein the second outlet port is positioned above the first outlet port, and the diameter of the inner cylindrical body at the level of the second outlet port is smaller than the diameter of the inner cylindrical body at the level of the first outlet port.

According to an aspect, the invention provides a swivel stack as described above, wherein in the axial direction, the first cylindrical annular element and the second cylindrical annular element are spaced apart by a distance at least equal to a height of the first or second cylindrical annular element.

By providing such a space the lower or upper cylindrical annular element can be moved upward or downward which allows that seals between the respective cylindrical annular element and the associated toroidal cavity of the inner cylindrical body can be replaced.

According to an aspect, the invention provides a swivel stack as described above, wherein the swivel stack comprises at least four cylindrical annular elements, and the cylindrical annular elements are paired with an intermediate space at least slightly larger than at least the height of one of the cylindrical annular elements that are adjacent to said space.

By grouping the cylindrical annular elements in pair, a space for seal replacement is available for each cylindrical annular element in each pair.

According to an aspect, the invention provides a swivel stack as described above, wherein the inner mounting ring consists of mounting ring segments and the bushing ring consists of bushing ring segments.

According to an aspect, the invention provides a swivel stack as described above, wherein the inner cylindrical body comprises a central cylindrical hole for routing further flow-lines and/or electrical cables.

According to an aspect, the invention provides a swivel stack as described above, further comprising a second inner cylindrical body and a clamping device, the second inner cylindrical body being mounted on the circular top surface of the inner cylindrical body, with the clamping device being positioned at the interface between the inner cylindrical body and the second inner cylindrical body and providing a mechanical coupling between the inner cylindrical body and the second inner cylindrical body.

According to an aspect, the invention provides a swivel stack as described above, wherein the at least one internal conduit in the inner cylindrical body is aligned with a corresponding internal conduit in the second inner cylindrical body.

According to an aspect, the invention provides a swivel stack as described above, wherein said inner cylindrical body is a substantially massive cylindrical body.

Also, the invention relates to a vessel for offshore operations and comprising a turret mooring system, wherein the turret mooring system is equipped with a swivel stack as described above.

Advantageous embodiments are further defined by the dependent claims.

BRIEF DESCRIPTION OF DRAWINGS

The invention will be explained in more detail below with reference to drawings in which illustrative embodiments thereof are shown. The drawings are intended exclusively for illustrative purposes and not as a restriction of the inventive concept. The scope of the invention is only limited by the definitions as presented in the appended claims.

DETAILED DESCRIPTION OF EMBODIMENTS

In the following description, reference will be made to "top", "bottom", "above", "below", "upper", and "lower" positions of various parts of the swivel stack relative to each other. These positions refer to a situation and orientation of the swivel stack when the swivel stack is mounted on a vessel. The vessel may be an FPSO vessel that during operation is moored at a location on sea near a petrochemical well for oil and/or gas.

Figure 1:
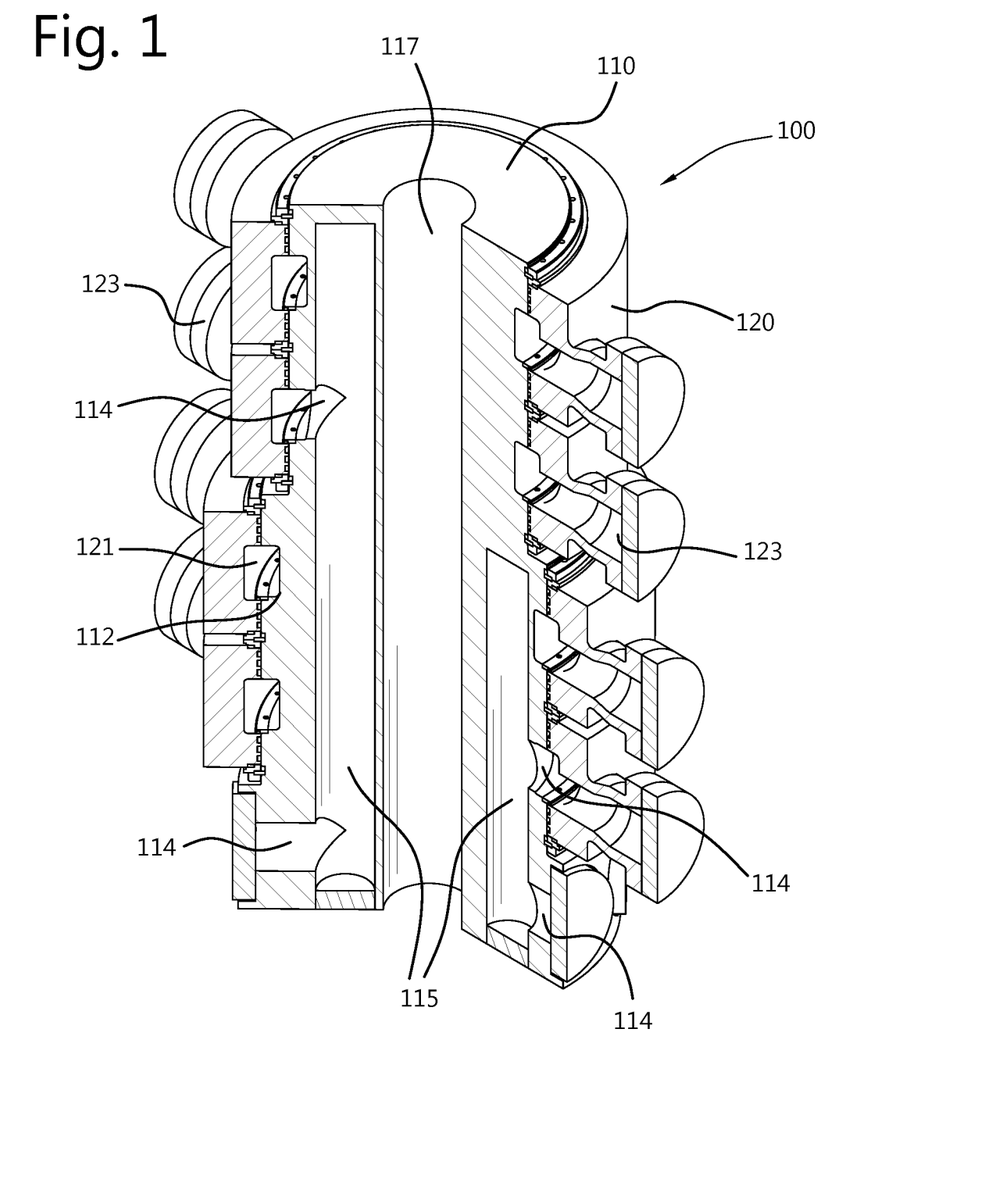
FIG. 1 shows a perspective view in cross-section of a swivel stack according to an embodiment of the invention.

FIG. 1 shows a cross-section in perspective view of a swivel stack according to an embodiment of the invention.

In an embodiment, the swivel stack 100 comprises an inner cylindrical body 110 and a plurality of cylindrical annular elements 120.

The inner cylindrical body 110 is a substantially massive cylindrical body. The body can be created by for example casting, forging or hot isostatic pressing.

In the inner cylindrical body 110 a number of conduits 115 is arranged that run parallel to the rotation axis of the cylinder.

On the cylindrical surface of the inner cylindrical body 110 a number of outlet ports 114 is provided that are in fluid communication with an associated conduit 115. Also, a circumferential cavity 112 is formed on the cylindrical surface of the inner body 110 at the level of each outlet port 114.

The cylindrical annular element 120 is provided with a toroidal cavity 121 in its inner cylindrical surface that faces the inner cylindrical body 110. At an outer cylindrical surface, the annular element 120 is provided with a connecting pipe piece 123 for connecting with product piping on the FPSO vessel (shown schematically).

The cylindrical annular elements 120 are arranged around the inner cylindrical body 110 and positioned at the level of an associated outlet port 114. When positioned, the toroidal cavity 121 of the annular element 120 and the circumferential cavity 112 form an annular chamber 130 that acts as a rotary interface for transfer of fluid from a well connected to the conduit 115 through a riser line to a product piping aboard the FPSO vessel.

The mounting of the annular elements 120 will be described in more detail with reference to FIG. 2.

The one or more conduits 115, internal of the cylindrical body 110, may have a same or shorter length than the length of the inner cylindrical body 110, depending on a design of the routing of the fluid(s) through the swivel stack.

Furthermore, in the swivel stack, optionally, a cylindrical hole 117 is provided in the inner cylindrical body 110. Such a hole 117 allows for routing further flow-lines and/or electrical cables (not shown) through the swivel stack to a higher level. Preferably the cylindrical hole 117 coincides with the cylindrical axis of the inner cylindrical body 110.

Figure 2:
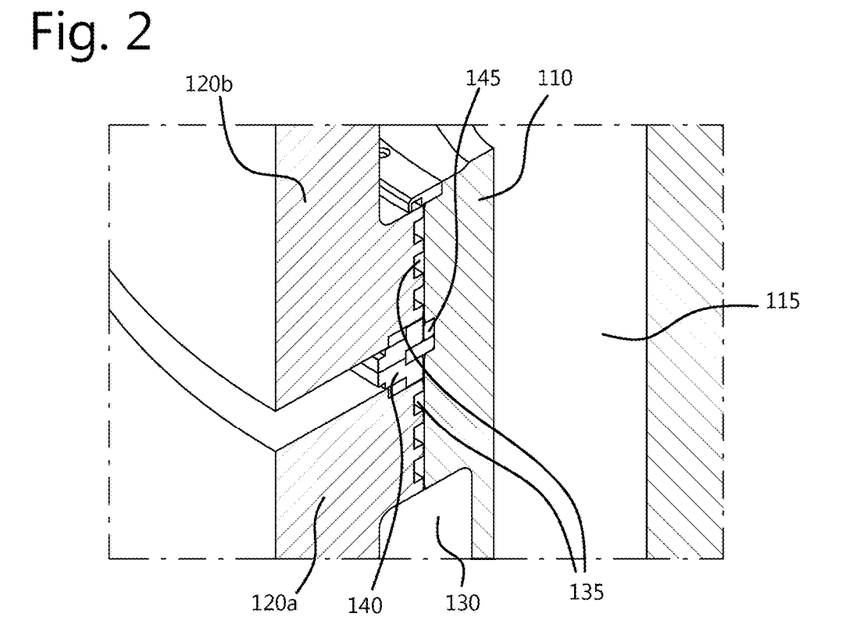
FIG. 2 shows a cross-section in perspective view of a detail of the swivel stack.

FIG. 2 shows a cross-section in perspective view of a detail of the swivel stack.

In FIG. 2 entities with the same reference number as shown in the preceding Figures refer to corresponding or similar entities.

FIG. 2 shows a detail of the cylindrical surface of the inner cylindrical body 110, a portion of a lower positioned annular element 120a and a portion of a higher positioned annular element 120b. Also, a part of the annular chamber 130 associated with the lower positioned annular element 120a is shown.

Each of the annular elements 120a, 120b is axially locked on the inner cylindrical body 110 by radially extending annular bushings 140 below and above the respective annular element.

According to an embodiment, the bushing ring of the upper bushing comprises a downward facing supporting surface for an upper radial surface (i.e., a surface extending in radial direction) of the cylindrical annular element.

According to an embodiment, the bushing ring of the lower bushing comprises an upward facing supporting surface for a lower radial surface of the cylindrical annular element.

In the figure, one bushing 140 is shown that is shared between the lower and upper annular elements.

At the interface between the inner cylindrical body 110 and the inner cylindrical surface of each annular element 120a, 120b a seal assembly 135 is provided.

Each bushing 140 is received in a circumferential groove 145 in the cylindrical surface of the inner cylindrical body 110. Basically in the groove 145, an inner mounting ring is arranged on which a bushing ring is installed. The bushing ring provides radial surfaces that contact and support the radial surfaces of the annular elements. Typically, the bushing surfaces are prepared as low friction surfaces. In this manner, the annular elements 120a, 120b; 120 are locked axially, while rotation of the annular element around the inner cylindrical body remains possible.

Figure 3:
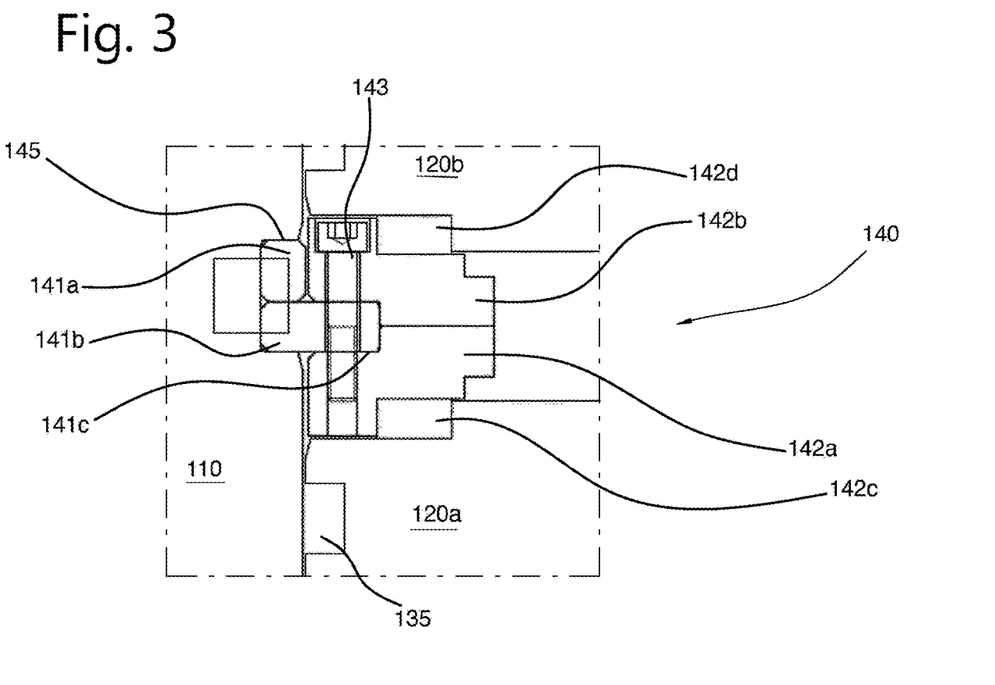
FIG. 3 shows a cross-section of a bushing for mounting a cylindrical annular element on the swivel stack.

Referring to following FIG. 3, a detailed embodiment of a bushing 140 is described.

FIG. 3 shows a cross-section of a bushing for mounting a cylindrical annular element on the swivel stack.

In FIG. 3 entities with the same reference number as shown in the preceding Figures refer to corresponding or similar entities.

In an embodiment, the bushing 140 comprises an inner mounting ring 141a, 141b and a bushing ring 142a, 142b, 142c, 142d. The inner mounting ring 141a, 141b is constructed with a radially protruding edge 141c that can be positioned in a circumferential groove on the cylindrical surface of the inner cylindrical body 110.

The bushing ring 142a, 142b, 142c, 142d is mounted on the radially protruding edge 141c of the inner mounting ring 141a, 141b.

As the inner mounting ring and the bushing ring each are assembled from ring segments, bolts 143 are used to connect the respective segments and to form the assembled bushing 140.

In an embodiment, the inner mounting ring comprises a top split ring 141a, and a bottom split ring 141b. The top split ring 141a and the bottom split ring 141b are received in the circumferential groove 145. The overall width of the top split ring 141a and the bottom split ring 141b match the width of the circumferential groove to avoid backlash. Further in this embodiment, the top split ring 141a has a thickness corresponding with a depth of the circumferential groove. The bottom split ring 141b has a thickness larger than the depth of the circumferential groove, such that the protruding portion of the bottom split ring forms the radial protruding edge 141c. Also, the bushing ring is a compound ring. The bushing ring of the upper bushing comprises a bottom bushing ring 142a, a top bushing ring 142b, a lower support surface 142c and an upper support surface 142d. The bottom bushing ring 142a is mounted on an lower surface of the protruding edge 141c. The top bushing ring 142a is mounted on an upper surface of the protruding edge 141c. Between the bottom bushing ring 142a and an radial surface of the lower annular element 120a the lower supporting surface 142c is provided. Between the top bushing ring 142b and an radial surface of the upper annular element 120b the upper supporting surface 142d is provided.

According to an embodiment, the bushing ring assembly in between the lower and upper annular elements, comprises a top bushing ring mounted on an upper radial surface of the protruding edge and a bottom bushing ring mounted on a lower radial surface of the protruding edge.

Each of the supporting surfaces 142c, 142d of the bushing ring comprises a low friction surface material.

FIG. 4 shows a detail of the annular chamber between the cylindrical annular element and the inner cylindrical body of the swivel stack.

Figure 4A:
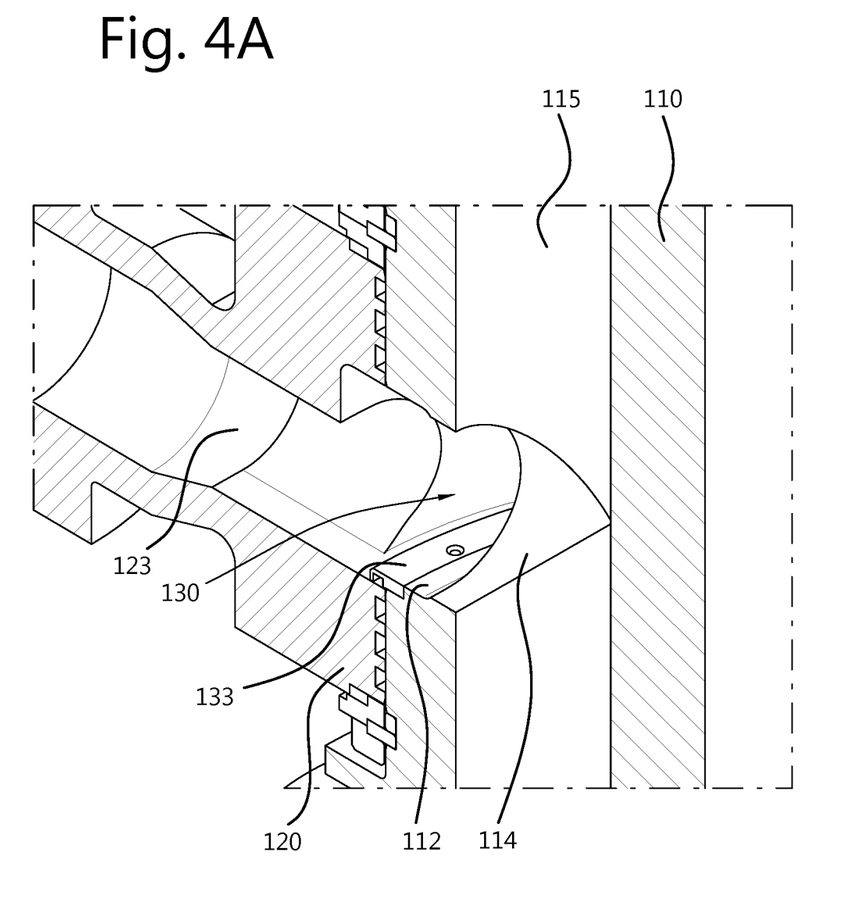
FIG. 4a shows a detail of the annular chamber between the cylindrical annular element and the inner cylindrical body of the swivel stack.

In FIG. 4a entities with the same reference number as shown in the preceding Figures refer to corresponding or similar entities.

According to an embodiment, the annular chamber 130 of a swivel is provided with a sand seal ring 133.

The sand seal ring 133 is mounted, preferably bolted with bolts in axial direction, on a bottom edge of the circumferential cavity 112. The sand seal ring 133 is configured with a flange edge that overlaps with a bottom portion of the toroidal cavity 121 of the cylindrical annular element 120. To allow mounting of the sand seal ring 133, according to embodiments, the sand seal ring is split (in two halves or more segments) and the segments are pre-mounted inside the outer part toroidal cavity. Once in position, the seal ring is accessed through the outer part nozzle(s), i.e., the connecting pipe piece(s) 123 to place bolts and attach the seal ring on the inner circular body below/at the bottom edge of the circumferential cavity 112.

Figure 4B:
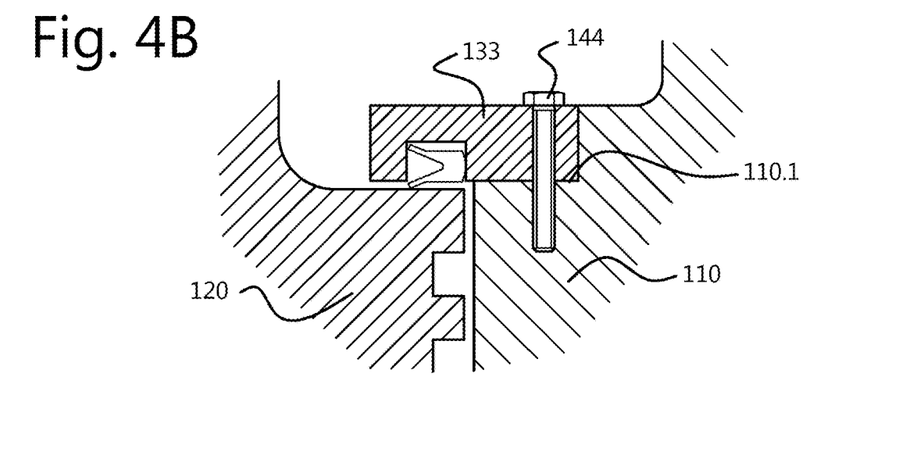
FIGS. 4b-4d show a cross-section of a respective embodiment of a sand seal ring mounted in the annular chamber.
Figure 4C:
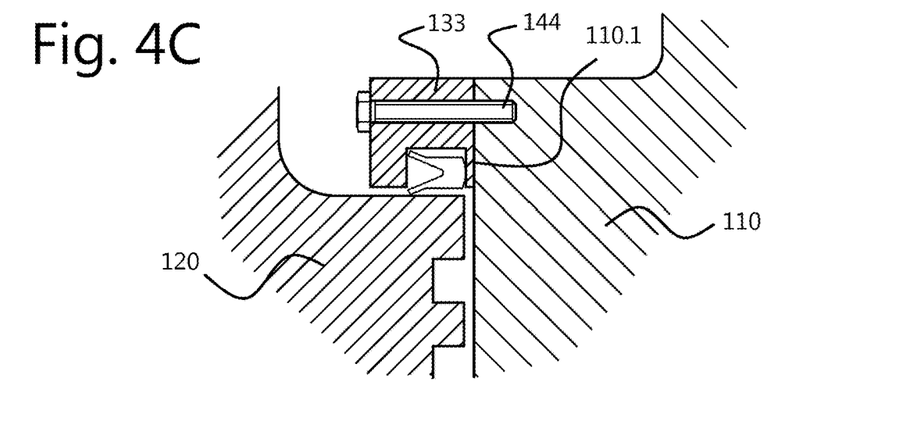
Figure 4D:
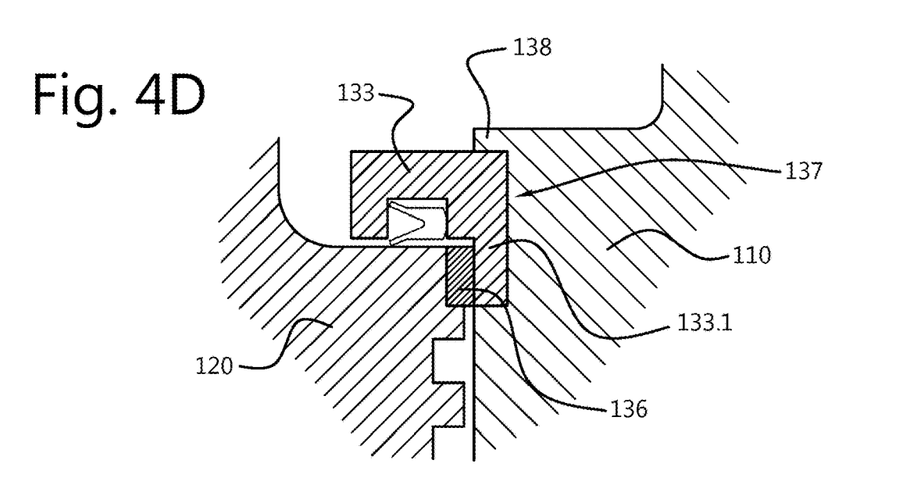

In FIGS. 4b-4d cross-sections of alternative mountings of the sand seal ring within the annular chamber are shown.

In FIG. 4b, a cross-section is shown of the sand seal ring 133 as mounted as shown in FIG. 4a. The sand seal ring 133 is mounted on a recessed edge 110.1 of the inner cylindrical body 110. Bolts 144 are running in axial direction through the sand seal ring to fasten the ring on the edge of the inner cylindrical body 110.

Alternatively, as show in FIG. 4c, the sand seal ring 133 can be provided with radial holes to allow mounting with bolts 144 positioned radially in the inner circular body 110.

FIG. 4d shows an alternative mounting of the sand seal ring 133 that can omit the use of bolts to attach the seal ring. A supporting edge 133.1 of the sand seal ring 133 is positioned in a groove 137 with an upper radial flange 138 in the inner cylindrical body and is covered by a radial bush 136 on the annular element 120, to hold the sand seal ring 133 in a fixed position.

In an embodiment, the radial bush 136 is arranged with a low friction surface for contacting the sand seal ring 133.

In each embodiment as shown in FIG. 4a-4d, the overlapping flange of the sand seal ring 133 covers the interface between the inner cylindrical body 110 and the annular element 120, and prevents during use the ingress of solid particles from fluid that is passing through the annular chamber 130 into the lower seal cavity 135.

Figure 5:
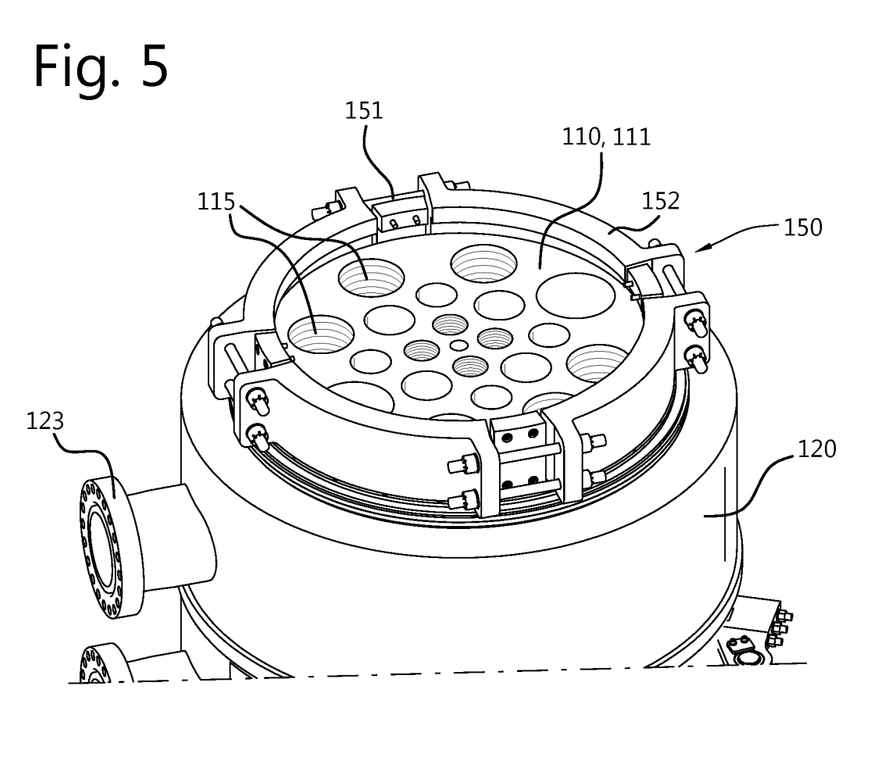
FIG. 5 shows a perspective detail view of a clamping system for the swivel stack.

FIG. 5 shows a perspective detail view of a clamping system for the swivel stack.

In FIG. 5 entities with the same reference number as shown in the preceding Figures refer to corresponding or similar entities.

In an embodiment, the inner cylindrical body can be extended in axial direction by a further or second inner cylindrical body (not shown) that is mounted on a top 111 of the inner cylindrical body 110. The second inner cylindrical body is positioned with its base on the top 111 of the inner cylindrical body 110, and oriented in a position that the location of one or more of conduit openings 115 of the lower inner cylindrical body matches with the location of corresponding conduit openings in the base of the second inner cylindrical body.

To couple the inner cylindrical body 110 and the second inner cylindrical body a clamping ring 150 is provided. The clamping ring comprises a number of clamps 152 bolted together. In-between the main clamps 152, auxiliary clamps 151 permit to temporarily remove the main clamps as and when needed—e.g. during seal change out operation where the massive clamps 152 constitute an obstacle to the sliding of the swivel outer part 120. The thinner clamps 151 are sufficient to hold the upper part of the swivel stack during calm or mild weather (small enough swivel stack loads).

In an embodiment, the clamping ring 150 comprises four clamps each: 4 main clamps 152 and 4 auxiliary clamps 151. Different numbers of clamps per set are also possible (i.e., at least two or more).

When the second inner cylindrical body is mounted on the inner cylindrical body 110, the clamping ring 150 is in compression fitting with the top 111 (or upper rim) of the inner cylindrical body 110 and also with the base or lower rim of the second inner cylindrical body.

Figure 6:
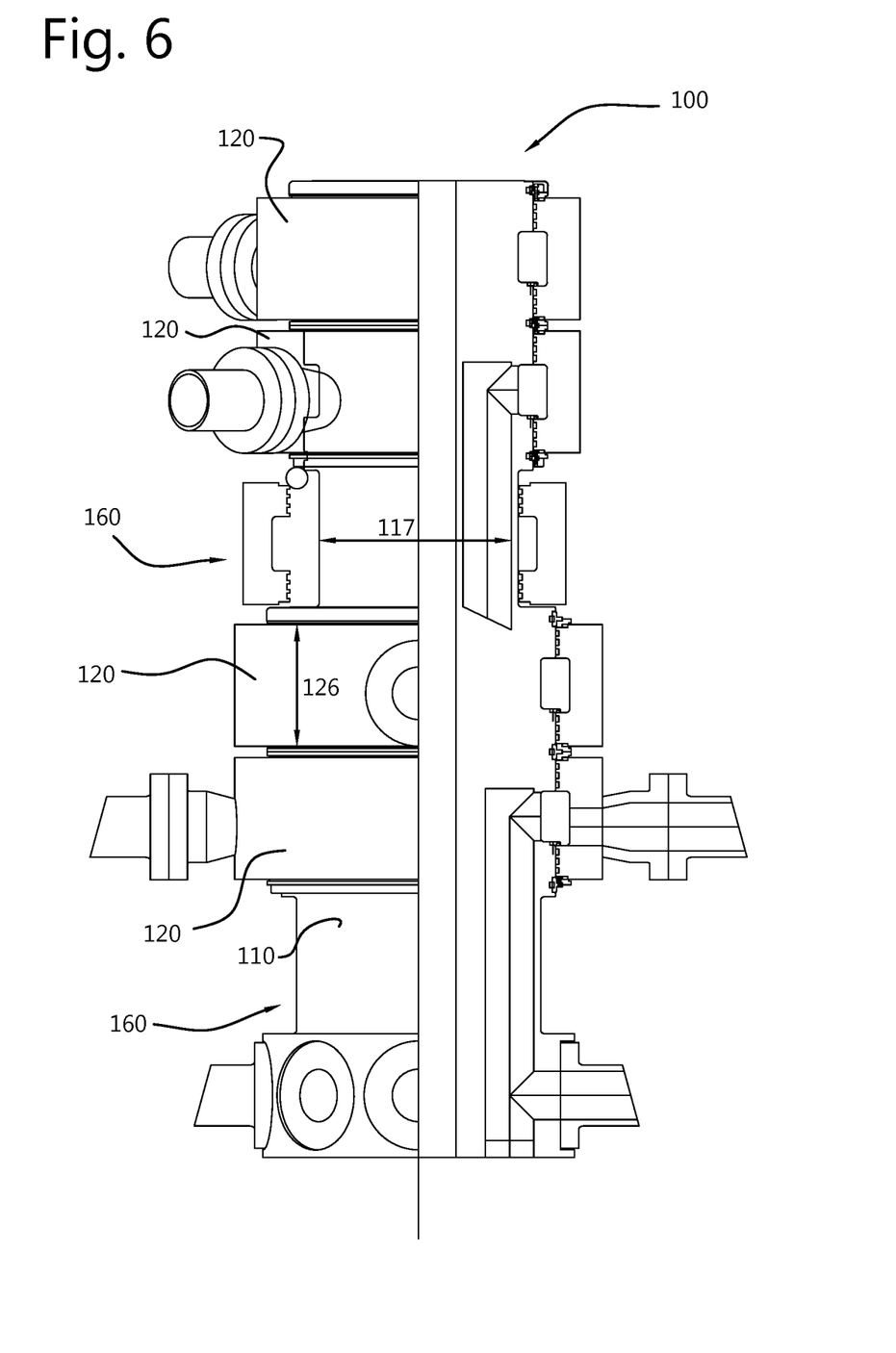
FIG. 6 shows a schematic view of a swivel stack in accordance with an embodiment of the invention.

FIG. 6 shows a schematic partially cross-sectional view of a swivel stack in accordance with an embodiment of the invention.

In FIG. 6 entities with the same reference number as shown in the preceding Figures refer to corresponding or similar entities.

In an embodiment, the swivel stack 100 comprises multiple cylindrical annular elements 120 mounted on the inner cylindrical body 110.

Intermediate two directly stacked cylindrical annular elements 120 an interval space 160 is provided of a size at least slightly larger than a height 126 of the cylindrical annular elements. In the interval space 160 the diameter 117 of the inner cylindrical body is smaller than at the level of the outlet ports 130 associated with the cylindrical annular elements 120.

In this manner, an option is provided for seal revisions of the cylindrical annular element during maintenance of the swivel stack. Each of the cylindrical annular elements 120 can be moved from its position at the level of the associated outlet port 130 into the interval space 160 (either upward or downward). Since the diameter 117 of the inner cylindrical body is relatively smaller at the level of the interval space 160, some manoeuvering space between the cylindrical annular element 120 and the inner cylindrical body 110 is provided to operators to replace or repair seals on the inner cylindrical surface of the annular element 120.

In a further embodiment, cylindrical annular elements are grouped in pairs. In-between pairs the interval space is provided as explained before. Thus, the swivel stack according to this embodiment, comprises at least four cylindrical annular elements 120, and the cylindrical annular elements 120 are paired with a space 160 equal to the size of slightly larger than the height 126 of the cylindrical annular elements that are adjacent to said space.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims.

The invention claimed is:

1. Swivel stack for transfer of fluid across a rotary interface around a main rotation axis between an incoming flow-line and an outgoing flow-line, the swivel stack comprising an inner cylindrical body and at least a first cylindrical annular element, the at least first cylindrical annular element mounted on the inner cylindrical body such that the rotation axis of the annular element and the rotation axis of the cylindrical body coincide;

the inner cylindrical body having at least one internal conduit running from a cylindrical base of the inner cylindrical body parallel to the rotation axis of the inner cylindrical body;

the at least one conduit having an outlet port in communication with a circumferential cavity on the cylindrical surface of the inner cylindrical body; the at least first cylindrical annular element comprising a toroidal cavity on its internal cylindrical surface;

the at least first cylindrical annular element being mounted on the inner cylindrical body at the level of the outlet port of the conduit to provide that the toroidal cavity and the circumferential cavity form an annular chamber in fluid communication with the outlet port of the at least one internal conduit, and the cylindrical surface of the inner cylindrical body comprising a first circumferential groove below the level of the outlet port, in which a lower bushing is received, and a second circumferential groove above the level of the outlet port in which an upper bushing is received;

the cylindrical annular element being rotatable around the inner cylindrical body while axially in locked position at the level of the outlet port of the conduit between the lower bushing and the upper bushing, wherein, in the inner cylindrical body a number of conduits is arranged that run parallel to the rotation axis of the cylinder, and on the cylindrical surface of the inner cylindrical body a number of outlet ports is provided that are in fluid communication with an associated conduit; and at least a second cylindrical annular element, the second cylindrical annular element being mounted on the inner cylindrical body below the lower bushing of the first cylindrical annular element or above the upper bushing of the first cylindrical annular element, the second cylindrical annular element comprising a toroidal cavity on its internal cylindrical surface and is mounted on the inner cylindrical body at the level of a second outlet port of the conduit to provide that the toroidal cavity of the second cylindrical annular element and the circumferential cavity associated with the second outlet port form an annular chamber in fluid communication with the associated conduit.

2. Swivel stack according to claim 1, wherein a sand seal ring is mounted on a bottom edge of the circumferential cavity configured for overlap with a bottom portion of the toroidal cavity of the cylindrical annular element.

3. Swivel stack according to claim 1, wherein each of the upper and lower bushings comprises an inner mounting ring and a bushing ring;

the inner mounting ring comprising a radial protruding edge and being positioned in the respective circumferential groove;

the bushing ring being mounted on the radial protruding edge of the inner mounting ring.

4. Swivel stack according to claim 3, wherein the inner mounting ring comprises a top split ring, and a bottom split ring; the top split ring and bottom split ring having a width corresponding with a width of the circumferential groove;

the top split ring having a thickness corresponding with a depth of the circumferential groove; the bottom split ring having a thickness larger than the depth of the circumferential groove, such that the protruding portion of the bottom split ring forms the radial protruding edge.

5. Swivel stack according to claim 1, wherein the diameter of the inner cylindrical body at the level of the second outlet port is identical to the diameter of the inner cylindrical body at the level of the first outlet port.

6. Swivel stack according to claim 1, wherein the second outlet port is positioned above the first outlet port, and the diameter of the inner cylindrical body at the level of the second outlet port is smaller than the diameter of the inner cylindrical body at the level of the first outlet port.

7. Swivel stack according to claim 5, wherein in the axial direction the first cylindrical annular element and the second cylindrical annular element are spaced apart by a distance larger than a height of the first or second cylindrical annular element.

8. Swivel stack according to claim 7, wherein the swivel stack comprises at least four cylindrical annular elements, and the cylindrical annular elements are paired with a space equal to the distance larger than the height of one of the cylindrical annular elements that are adjacent to said space.

9. Swivel stack according to claim 3, wherein the inner mounting ring consists of mounting ring segments and the bushing ring consists of bushing ring segments.

10. Swivel stack according to claim 1, wherein the inner cylindrical body comprises a central cylindrical hole for routing further flow-lines and/or electrical cables.

11. Swivel stack according to claim 1, further comprising a second inner cylindrical body and a clamping device, the second inner cylindrical body being mounted on the circular top surface of the inner cylindrical body, with the clamping device being positioned at the interface between the inner cylindrical body and the second inner cylindrical body and providing a mechanical coupling between the inner cylindrical body and the second inner cylindrical body.

12. Swivel stack according to claim 11, wherein the at least one internal conduit in the inner cylindrical body is aligned with a corresponding internal conduit in the second inner cylindrical body.

13. Vessel for offshore operations and comprising a turret mooring system, wherein the turret mooring system is equipped with a swivel stack according to claim 1.

14. Swivel stack according to claim 2, wherein each of the upper and lower bushings comprises an inner mounting ring and a bushing ring;

the inner mounting ring comprising a radial protruding edge and being positioned in the respective circumferential groove;

the bushing ring being mounted on the radial protruding edge of the inner mounting ring.

15. Swivel stack according to claim 2, further comprising at least a second cylindrical annular element;

the second cylindrical annular element mounted on the inner cylindrical body below or above the first cylindrical annular element;

wherein the at least one conduit has a second outlet port in communication with a circumferential cavity on the cylindrical surface of the inner cylindrical body;

the second cylindrical annular element comprises a toroidal cavity on its internal cylindrical surface and is mounted on the inner cylindrical body at the level of the second outlet port of the conduit to provide that the toroidal cavity of the second cylindrical annular element and the circumferential cavity associated with the second outlet port form an annular chamber in fluid communication with the second outlet port of the at least one internal conduit.

16. Swivel stack according to claim 3, further comprising at least a second cylindrical annular element;

the second cylindrical annular element mounted on the inner cylindrical body below or above the first cylindrical annular element;

wherein the at least one conduit has a second outlet port in communication with a circumferential cavity on the cylindrical surface of the inner cylindrical body;

the second cylindrical annular element comprises a toroidal cavity on its internal cylindrical surface and is mounted on the inner cylindrical body at the level of the second outlet port of the conduit to provide that the toroidal cavity of the second cylindrical annular element and the circumferential cavity associated with the second outlet port form an annular chamber in fluid communication with the second outlet port of the at least one internal conduit.

17. Swivel stack according to claim 1, wherein one bushing of said lower and upper bushing is shared between said first and second cylindrical element and provides radial surfaces that contact and support radial surfaces of the first and second annular elements.

* * * * *